March 20, 1934.    J. KRANZHOFF    1,952,015
AUTOMOBILE JACK
Filed Oct. 21, 1932    2 Sheets-Sheet 1
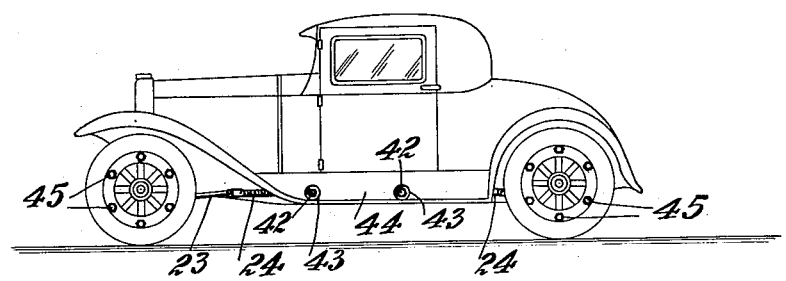
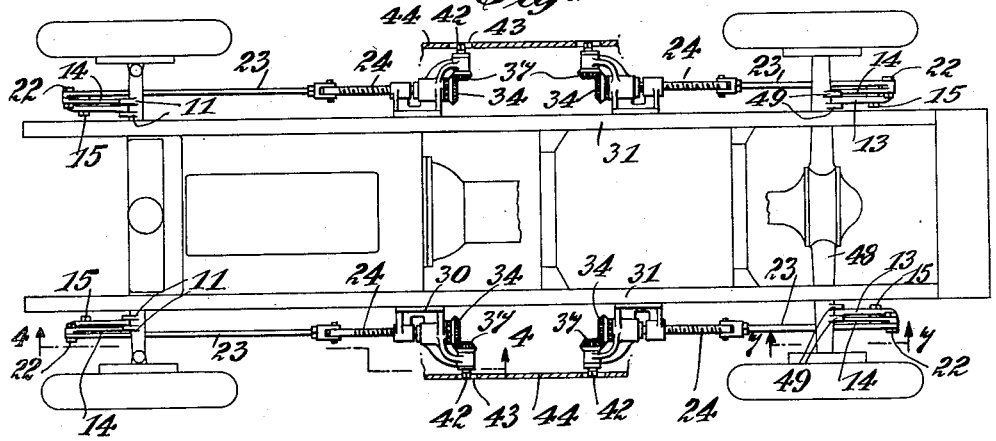
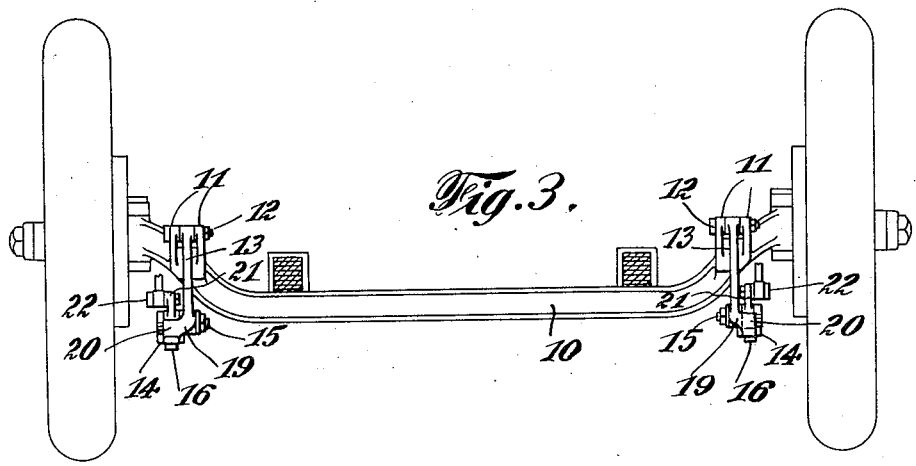
INVENTOR-
John Kranzhoff
BY
Howard Freeman
his ATTORNEY- March 20, 1934.　　J. KRANZHOFF　　1,952,015
AUTOMOBILE JACK
Filed Oct. 21, 1932　　2 Sheets-Sheet 2
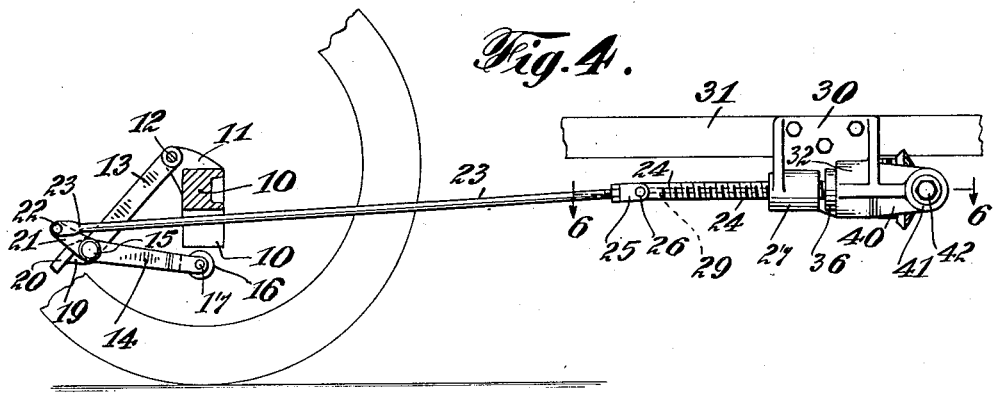
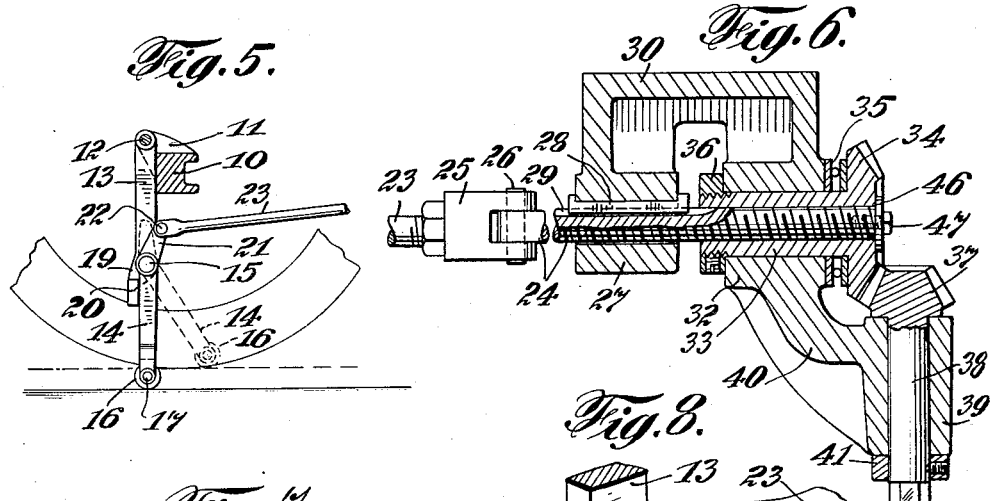
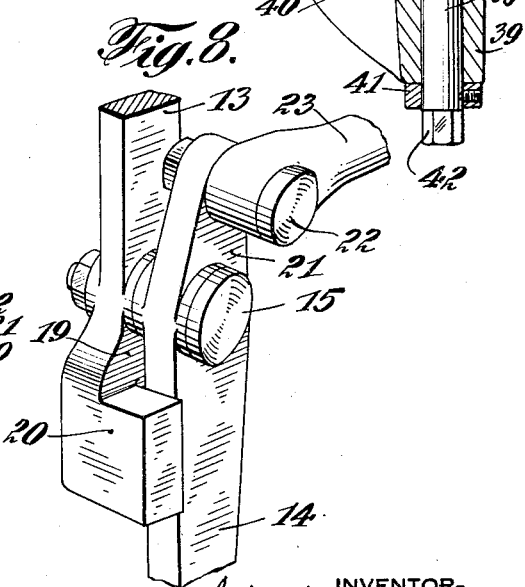
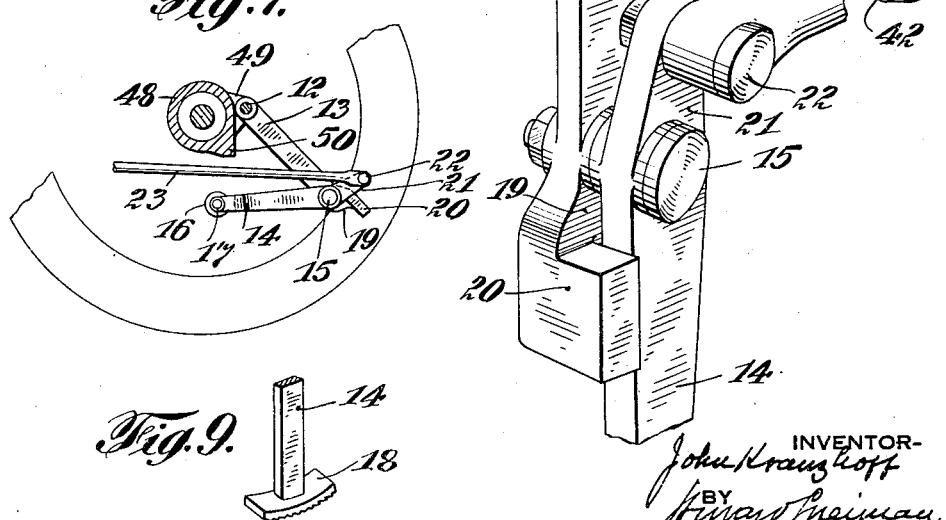
INVENTOR-
John Kranzhoff
BY
ATTORNEY- Patented Mar. 20, 1934

1,952,015

UNITED STATES PATENT OFFICE 1,952,015

AUTOMOBILE JACK

John Kranzhoff, Brooklyn, N. Y.

Application October 21, 1932, Serial No. 638,985

9 Claims. (Cl. 254—86)

My invention relates generally to motor vehicle equipment and relates particularly to automobile jacks of the type designed to be installed upon the car as permanent equipment thereon.

Commonly proposed jacks of this nature have been so complicated, cumbersome and expensive as to be impractical, and have not come into general use. The usual segregated automobile jack is universally known to be unsatisfactory, not only that it must be carried and handled as a separate item, but it is inconvenient to use and more or less ineffective in operation. With such a jack, it has proved practically impossible for a woman driver to change a tire on her car.

A general object of my invention is to abolish these unsatisfactory conditions and objections and to make it convenient and easy for a motorist to raise any one or all of the wheels of his motor car off the ground, as may be desired, substantially anywhere, at any time. In this connection, an object of my invention is to provide a simple and economical device which is well adapted to be installed on the motor car as a permanent part or feature thereof, most desirably this being done at the factory in building the car, but not necessarily. Other objects of my invention are lightness so as not unduly to increase the weight of the car, compactness of construction so as to occupy only readily available space underneath the car without interfering in any way with other parts of the car as ordinarily constructed, durability, reliability, and effectiveness in operation.

Other more particular objects and advantages of my invention will hereinafter appear.

For carrying out my invention in a practical manner I provide a separate lifting device or jack for each wheel of the car, these four devices all being of a similar construction and each being operable independently of any of the others. Each such device comprises a lifting toggle operated by a longitudinally movable rod which is thus moved by screw means, such device being specially devised and constructed in a particular manner so as to constitute a desirable practical embodiment of my invention operating in a special manner.

More particularly, in such an embodiment of my invention, an upper toggle link has an upper end permanently pivotally mounted on the axle of the car to swing in a vertical plane extending longitudinally of the car, while a lower toggle link has a lower end to engage with the ground, these two toggle links being pivoted together, the toggle being so constructed and the operating rod being connected thereto in such manner as to operate both of its links in each direction of their movement, the arrangement desirably being such that a pull on this rod will unfold the toggle downwardly and straighten it in the lifting operation, while pushing on this rod will break the toggle and fold both of its links upwardly in compact relation beneath the car.

The screw means for thus moving the operating rod may comprise a non-rotatable slidably guided traveling screw which is moved longitudinally by a nut which is journaled in a bearing on the chassis. This nut may be rotated in either direction through suitable gearing driven by an operating shaft having a polygonal outer end which is readily accessible from the side of the car at the outside just above the running board and designed to be rotated by means of the usual crank wrench which is always carried on the car for use on the tire-retaining nuts of the wheels.

My invention further includes various features of construction and combination of parts, as will appear from the following description.

The accompanying drawings, in which similar parts are designated by similar numerals, show one practical embodiment of my invention, together with a slight modification.

Figure 1 is a reduced side elevation of an automobile embodying my invention.

Figure 2 is a plan view of the automobile chassis showing my invention as embodied therein.

Figure 3 is an enlarged front elevation of the lower portion of the chassis embodying my invention.

Figure 4 is a vertical section on the line 4—4 of Figure 2.

Figure 5 is a similar view but showing some of the operating parts in operated position.

Figure 6 is a further enlarged horizontal section on the line 6—6 of Figure 4.

Figure 7 is a vertical section on the line 7—7 of Figure 2.

Figure 8 is a much enlarged perspective view of a toggle joint.

Figure 9 is a perspective view showing a modified lower end portion of a lower toggle link.

Since all of the four devices of my invention illustrated in the accompanying drawings are of substantially the same construction, a particular description of one of them will, for the most part, serve, equally well for all, and the same reference numerals may be advantageously employed throughout for the similar corresponding parts in all of the illustrated devices. In the particular embodiment and installation of my invention shown in the drawings, the slight differences to be noted are that the jack devices are made of right-hand and left-hand design for the opposite sides of the car; that these devices respectively at the front and rear are arranged reversely; that the toggle mountings on the front and rear axles are slightly different; and that the toggle-operating rods at the front are of greater length than those at the rear, this being due to the particular design of the car shown in the drawings. Since the left side front device has been the most extensively illustrated in the drawings, the following description may be considered as having more particular reference to that device, although applicable in a substantially similar manner to each of the others.

The front axle 10, adjacent its left end, which appears at the right in Figure 3, rigidly carries a supporting bracket 11, which is desirably formed integrally or in one piece with the axle as indicated in the drawings, although it might be a separate piece rigidly secured to the axle. This bracket is shown as projecting a short distance upwardly and forwardly and is desirably bifurcated to provide laterally spaced arms as shown. This bracket carries a pivot pin 12 forming a pivotal connection for the upper end of an upper toggle arm or link 13, which in the normally folded idle condition of the toggle may extend forwardly at a downward inclination, as shown most clearly in Figure 4, and which in the extended operating condition of the toggle may extend straight downward in abutting relation with the front face of the bracket-carrying portion of the axle, as shown in Figure 5.

The lower end portion of the upper toggle link 13 and the upper end portion of a lower toggle arm or link 14 are pivoted together by means of a pivot pin 15. The lower end of the lower toggle link 14 carries a ground roller 16 shown as journaled between end forks on this toggle link by means of a pin 17; or the lower end of this lower toggle link 14 may carry a curved ground plate or foot 18 having a longitudinally rounded tread, which may be roughened, this modification being shown in Figure 9. In the normally folded idle condition of the toggle, its lower link 14 extends rearwardly from its pivot pin 15 and may also have a slight downward inclination as shown in Figure 4, more particularly. In the operated or extended condition of the toggle, shown in Figure 5, the lower toggle link 14 extends straight downward in line with the upper toggle link 13, the axes of the pivots 12, 15 and 17 being in vertical alignment, the wheel of the car then being raised off the ground, as there shown in full lines, the angular position of the lower toggle link 14 at which its roller 16 comes in contact with the ground at the beginning of the lifting operation being indicated in broken lines.

In the construction shown in the drawings, the upper toggle link 13 has a downwardly and somewhat forwardly extending tail arm 19 provided with a laterally projecting stop lug 20 which, in the straightened or extended condition of the toggle, abuts against the lower toggle link 14 below the toggle pivot 15, to prevent overthrow of the toggle links 13 and 14 beyond their dead center position, as shown in Figures 5 and 8.

In the illustrated construction, the lower toggle link 14 has an upper lever arm 21, shown as out of alignment with this toggle link, this upper arm being provided with a pivot pin 22 by means of which the forward end of a longitudinally movable toggle-operating rod 23 is pivotally connected to this upper arm 21. Corresponding to the different positions of the toggle links 13 and 14, this operating rod 23 is shown as at its extreme forward position in Figures 1 to 4 inclusive, and is shown at its extreme rearward position in Figure 5. The means for moving this toggle-operating rod 23 longitudinally and for holding it in position will be presently described.

As illustrated in Figures 1 to 4 inclusive, the operating rod 23 sustains the toggle links 13 and 14 at their upwardly folded position, against their tendency to gravitational downward unfolding movement. Drawing or pulling in a rearward direction upon the operating rod 23 not only permits the toggle links 13 and 14 to move downward by reason of their weight, but positively moves both of these toggle links from the folded position thereof shown in Figures 2, 3 and 4 to their downwardly straightened car-supporting position shown in Figure 5. While this unfolding movement is taking place, it is immaterial whether or not one of these toggle links moves angularly on its mounting pivot at the same rate or to the same extent as the other, since finally both of these links 13 and 14 will be forced into their final effective position shown in Figure 5, with the upper toggle link 13 compelled to abut against the front axle 10 and the lower toggle link 14 compelled to abut against the stop lug 20, and it is obviously of no consequence that one of these abutting relations should happen to take place in advance of the other.

Referring now to Figure 5, the positively positioned operating rod 23 prevents any accidental breaking of the toggle. Forward movement imparted to the operating rod 23 by pushing thereon, will break the locked toggle and fold the toggle links 13 and 14 upwardly, as shown in Figure 4. The upper toggle link 13 will be compelled to swing forwardly to its final position by reason of the upper arm 21 of the lower toggle link 14 abutting against the upper edge face of the stop lug 20 on the upper toggle link 13, as shown in Figure 4. It is obvious that forward and upward movement of the upper toggle link 13 will cease when the forwardly moving operating rod 23 comes to rest at its forward position.

For carrying out my invention in a practical manner, suitable screw means are desirably employed for moving the operating rod 23 in each of its directions of longitudinal operating movement and for positively holding this rod at each of its above described operated positions. In the construction shown in the drawings as an exemplification of my invention, the rear end of the operating rod 23 is connected to the end of a forwardly extending unthreaded end portion of a horizontal longitudinally extending non-rotatable traveling screw 24. This is a pivotal connection made by means of a bifurcated head 25 on the rod 23 and a horizontal transversely extending pivot pin 26. This pivotal connection provides for the slight up and down swinging movement of the rod 23 at its forward pivot 22, as well as also for the spring-supported movement of the chassis frame relatively to the axles.

The screw 24 is longitudinally slidable in a bearing 27 and is prevented from rotating therein by means of a spline 28 engaging in a groove 29 in the screw. The bearing 27 is formed on a bracket 30 which is firmly and rigidly secured to the adjacent side bar 31 of the chassis frame and may be bolted thereto as shown in Figure 4.

Spaced rearwardly a short distance from and in alignment with the bearing 27, the bracket 30 is provided with another bearing 32 in which there is journaled an internally threaded sleeve or nut 33 having threaded engagement with the screw 24. The rear projecting end of the sleeve nut 33 has a miter gear 34 fixed thereon and shown as formed in the same piece therewith, by means of which the nut 33 may be rotated. A thrust-receiving ball bearing 35 is interposed between the back of the gear 34 and the end of the bearing 32, while the other end of the threaded sleeve 33 projects from the other end of this bearing and has a thrust collar 36 fixed thereon.

The gear 34 is engaged by a miter pinion 37 fixed on the inner end of and shown as formed in the same piece with a horizontal transverse outwardly extending stub shaft 38. This shaft 38 is journaled in a bearing 39 provided on the end of an arm 40 which projects from the bearing 32 and is shown as formed in the same piece therewith and with the supporting bracket 30. The inner end of the bearing 39 forms a thrust bearing which is shown as engaged by a boss or hub portion of the pinion 37. At the outer end of this bearing 39 a thrust collar 41 is fixed on the outwardly projecting stub shaft 38. Outwardly from this collar 41 the shaft 38 has a projecting polygonal (shown as hexagonal) outer end portion 42 by means of which the shaft 38 may be rotated in either direction, thus to constitute an operating shaft for the toggle links 13 and 14 in each direction of their above described movements. This shaft end 42 is exposed outwardly just above the running board of the car within an enlarged or oversize hole 43 through the side guard plate 44, as is shown in Figures 1 and 2, so as thus to be easily accessible from the outside at the side of the car. This shaft end 42 is made of a size to fit in the socket of the usual wrench (not shown) of the crank or brace type which is at all times carried for the tire bolts 45.

The rear end of the non-rotatable slidably traveling screw 24 is provided with a stop plate 46 which is shown as secured thereto by means of a tap bolt 47. This stop plate abouts against the fact of the gear 34 for limiting the forward sliding movement of the screw 24. This discontinues the upward and forward swinging movement of the upper toggle link 13, as well as relieves the operating rod 23 from undue pushing or thrusting strain thereon. The rearward or pulling traveling movement of this screw 24 will be stopped by the abutting of the upper toggle link 13 against the front axle 10 in connection with the abutting of the stop lug 20 against the lower toggle link 14. The thread of the non-rotatable slidably movable screw 24 is of sufficiently low pitch as to render it incapable of imparting rotation to the sleeve nut 33. Therefore this screw engagement will be effective to hold up the folded toggle links 13 and 14, and will be likewise effective to hold these toggle links with the toggle locked against accidentally breaking when the wheel of the car has been raised by extending these links.

The right side front jack device appears at the top and left in Figure 2 and at the left in Figure 3. In the particular construction shown in the drawings as an embodiment of my invention, it is desirable for symmetry that the devices should be designed and assembled as right and left for the corresponding sides of the car. The mechanical construction, as well as the manner of operation, of the right side front device is the same as hereinbefore described with reference to the left side front device. Therefore the same description is applicable to both of these devices and the same reference numerals have been applied to designate similar or corresponding parts, for the sake of both clarity and brevity.

The rear jack devices are installed on the car in a longitudinally reversed position in toto, as compared with the front devices. The slight differences, due principally to this different manner of mounting the devices on the car, will be noted. In other respects, the same description applies, together with the same reference numerals, which have been applied accordingly.

The rear jack device at the right side has the same design and assembly as the front device at the left side, while the rear device at the left side corresponds in like manner with the front device at the right. The toggle-operating rods 23, 23 of the rear devices are somewhat shorter than those of the front devices, the reason for which, in this particular instance, will be evident by an inspection of Figures 1 and 2. It will be noted that the toggle arms or links 13, 13 and 14, 14 in the rear devices break rearwardly and fold rearwardly and upwardly, instead of forwardly and upwardly, as in the front devices. However the mechanical construction, so far as the principle of operation is concerned, is the same. Thus with these rear devices the operating rods 23, 23 are drawn or pulled in a forward direction for straightening or extending the toggles downwardly to raise the car wheels and for locking the toggles to hold these wheels up, and are pushed rearwardly for breaking and folding the toggles.

The slightly different manner of pivotally mounting the upper toggle links 13, 13 on the rear axle housing 48 is more particularly shown in Figure 7 for the left side rear jack device. A short bifurcated supporting bracket 49, shown as in the same piece with the axle housing 48, projects rearwardly and slightly upwardly from this axle housing. Immediately below this bracket and virtually forming a part thereof, the axle housing 48 has thereon a downwardly extending lug 50, the rear face of which forms an abutment for the upper toggle link 13 in the locked condition of the toggle when the wheel of the car has been raised.

The operation of the illustrated and above described embodiment of my invention is as follows:—

All that a motorist has to do when he wishes to lift one of the wheels of his car off the ground, is to apply his usual tire-bolt crank or brace wrench to one of the shaft ends 42 and then turn this wrench in a right-hand or clockwise direction until such rotation is stopped by the locking of the toggle. When it is desired again to lower the wheel, the wrench is simply turned in the opposite or counter-clockwise direction, first to break the locked toggle and then to fold it up beneath the car, this rotation being stopped by the stop plate 46 abutting against the outer face of the gear 34. Clockwise rotation of course renders the work easier in raising the wheel, and this is provided for in each instance of the four independently manually operable jack devices. In this connection, it will be noted that in each instance the screw 24 has a right-hand thread and that the relation of the gears 34 and 37 to this screw is the same in each instance. It will also be noted that the applied lifting power is multiplied, both by the screw and the gearing, as well as also by the toggle. Also it might be noted that the raised wheel will be gradually lowered and not dropped.

It is to be noted that my invention provides for having any desired number of the wheels of the car raised at the same time. When parking for any considerable length of time, or when the car is standing idle in the garage, all four of its wheels may thus be raised, for relieving the tires.

A more or less different toggle arrangement might be employed for producing substantially similar results. However, that shown in the drawings, as well as also the entire illustrated construction exemplifying my invention, has the advantages of being simple, relatively inexpensive and effective for the purpose. Should greater lifting power be found desirable, such as in the case of very heavy motor vehicles, a different form of power-multiplying gearing could be employed, such as worm gearing, in place of the gear 34 and pinion 37.

I do not limit myself to the particular size, shape, number, arrangement or material of parts as shown and described, as these are given simply as a means for clearly describing the device of my invention. In fact, it is obvious that various modifications may be made in the construction shown in the drawings and above particularly described, within the principle and scope of my invention as defined in the appended claims.

What I claim is:—

1. In a wheel-raising device for motor vehicles, in combination, an upper toggle link the upper end of which is pivotally mounted on an axle of the vehicle to swing in a vertical plane longitudinally of the vehicle, a lower toggle link pivoted to the upper toggle link and having a ground-engaging lower end, a longitudinally movable operating rod pivotally connected with one of the toggle links and extending longitudinally of the vehicle, operating means for said rod including means which lock the toggle links at a downwardly extended position thereof, and means limiting the movement of both of said toggle links at their downwardly extended locked position.

2. In a wheel-raising device for motor vehicles, in combination, an upper toggle link the upper end of which is pivotally mounted on an axle of the vehicle to swing in a vertical plane longitudinally of the vehicle, a lower toggle link pivoted to the upper toggle link and having a ground-engaging lower end, a longitudinally movable operating rod pivotally connected with one of the toggle links and extending longitudinally of the vehicle, operating means for said rod including means which lock the toggle links at a downwardly extended position thereof and also which hold the toggle links at an upwardly folded position thereof, and means limiting the movement of both of said toggle links at their downwardly extended locked position and also limiting the movement of both of said toggle links at their upwardly folded position.

3. In a wheel-raising device for motor vehicles, in combination, an upper toggle link the upper end of which is pivotally mounted on a axle of the vehicle, a lower toggle link pivoted to the upper toggle link and having a ground-engaging lower end, operating means for said toggle links including means which lock the toggle links at a downwardly extended position thereof, and a stop on one of said toggle links in position to abut against the other said toggle link to prevent overthrow of these toggle links when they have been moved to an extended position relatively to each other.

4. In a wheel-raising device for motor vehicles, in combination, an upper toggle link the upper end of which is pivotally mounted on an axis of the vehicle, a lower toggle link pivoted to the upper toggle link and having a ground-engaging lower end, operating means for said toggle links including means which lock the toggle links at a downwardly extended position thereof, a stop on one of said toggle links in position to abut against the other said toggle link to prevent overthrow of these toggle links when they have been moved to an extended position relatively to each other, and a stop in position to be abutted by said upper toggle link at the downwardly extended position of the latter.

5. In a wheel-raising device for motor vehicles, in combination, an upper toggle link the upper end of which is pivotally mounted on the axle of the vehicle, a lower toggle link pivotally connected with the upper toggle link and having a ground-engaging lower end, an upper lever arm on the lower toggle link rigid therewith and projecting above its pivotal connection with the upper toggle link, and a longitudinally movable toggle-operating rod pivoted to said upper arm of the lower toggle link.

6. In a wheel-raising device for motor vehicles, in combination, an upper toggle link the upper end of which is pivotally mounted on the axle of the vehicle, a lower toggle link pivotally connected with the upper toggle link and having a ground-engaging lower end, an upper lever arm on the lower toggle link rigid therewith and projecting above its pivotal connection with the upper toggle link, a longitudinally movable toggle operating rod pivoted to said upper arm of the lower toggle link, means for locking the toggle links at a downwardly extended position thereof, a stop on one of said toggle links in position to abut against the other said toggle link to prevent overthrow of these toggle links when they have been moved to an extended position relatively to each other, and stop means for said upper toggle link when it has been moved to its downwardly extended position.

7. In a wheel-raising device for motor vehicles, in combination, upper and lower toggle links pivotally connected together with the upper end of the upper toggle link pivotally mounted on an axle of the vehicle, the said toggle links being arranged to be unfolded and extended downwardly from a normal upwardly folded position and to be returned upwardly to their normal upwardly folded position, means adapted to cause the pivotal movement of both of said toggle links in each of their said directions of movement, a non-rotatable longitudinally movable toggle-operating rod having a pivotal connection with the toggle formed by said toggle links for moving the latter in either direction between their folded and their extended positions, and operating means connected to said rod adapted to move the latter longitudinally in either direction including means adapted to lock the toggle at its downwardly extended position and also to hold the toggle at its normal upwardly folded position.

8. In a wheel-raising device for motor vehicles, in combination, an upper toggle link the upper end of which is pivotally mounted on an axle of the vehicle, a lower toggle link having a pivotal connection with the upper toggle link and having a ground-engaging lower end, an upper lever arm on the lower toggle link rigid therewith and projecting above its pivotal connection with the upper toggle link, a lower lever arm on the upper toggle link rigid therewith and projecting below said pivotal connection thereto of the lower toggle link, a stop lug carried by said lower lever arm in a position to be abutted by the lower toggle link to prevent overthrow of the toggle links when they have been moved to an extended position relatively to each other and to be abutted by said upper lever arm of the lower toggle link to transmit folding movement to the upper toggle link by the folding of the lower toggle link on the upper toggle link, means for stopping said upper toggle link at its folded position, stop means for said upper toggle link when it has been moved to its downwardly extended position, and means for locking the toggle links at their downwardly extended position including a longitudinally movable toggle-operating rod pivoted to said upper arm of the lower toggle link.

9. In a wheel-raising device for motor vehicles, in combination, an upper toggle link the upper end of which is pivotally mounted on an axle of the vehicle, a lower toggle link having a pivotal connection with the upper toggle link and having a ground-engaging lower end, an upper lever arm on the lower toggle link rigid therewith and projecting above its pivotal connection with the upper toggle link, a lower lever arm on the upper toggle link rigid therewith and projecting below said pivotal connection thereto of the lower toggle link, a stop lug carried by said lower lever arm in a position to be abutted by the lower toggle link to prevent overthrow of the toggle links when they have been moved to an extended position relatively to each other and to be abutted by said upper lever arm of the lower toggle link to transmit folding movement to the upper toggle link by the folding of the lower toggle link on the upper toggle link, means for stopping said upper toggle link at its folded position, stop means for said upper toggle link when it has been moved to its downwardly extended position, a longitudinally movable toggle-operating rod pivoted to said upper arm of the lower toggle link and extending away therefrom in a direction so that pulling upon said rod will extend the toggle links downward to their effective position while pushing upon said rod will fold the toggle links upwardly to their normally idle position, and operating means connected to said rod for thus moving the latter in either direction so that thereby during the extending movement of the toggle links the weight of the vehicle will be supported by a pulling strain on said rod, said operating means including means for locking the toggle links at their downwardly extended position and also for holding these links at their normal upwardly folded position.

JOHN KRANZHOFF.